(12) United States Patent
Akash et al.

(10) Patent No.: US 8,349,111 B2
(45) Date of Patent: Jan. 8, 2013

(54) METHOD FOR JOINING CERAMIC COMPONENTS

(75) Inventors: Akash Akash, Salt lake City, UT (US); Balakrishnan G. Nair, Sandy, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1571 days.

(21) Appl. No.: 11/781,125

(22) Filed: Jul. 20, 2007

(65) Prior Publication Data

US 2012/0175042 A1 Jul. 12, 2012

Related U.S. Application Data

(63) Continuation-in-part of application No. 11/464,476, filed on Aug. 14, 2006, now Pat. No. 7,628,951.

(51) Int. Cl.
B29C 65/00 (2006.01)
C03B 29/00 (2006.01)
C04B 37/00 (2006.01)

(52) U.S. Cl. ............... 156/89.11; 156/89.12; 156/60; 156/325

(58) Field of Classification Search ........... 156/89.11, 156/60, 325
See application file for complete search history.

(56) References Cited

U.S. PATENT DOCUMENTS

| | | | |
|---|---|---|---|
| 4,459,156 A | 7/1984 | Henslee et al. | |
| 4,833,576 A * | 5/1989 | Mers et al. | ................... 362/640 |
| 5,373,976 A | 12/1994 | Rancoule et al. | |
| 5,425,496 A | 6/1995 | Zhu et al. | |
| 5,478,413 A | 12/1995 | Mosser et al. | |
| 5,486,690 A | 1/1996 | Ake | |
| 5,652,064 A | 7/1997 | Mosser et al. | |
| 5,716,251 A | 2/1998 | Watkins | |
| 5,803,990 A | 9/1998 | Mosser et al. | |
| 5,962,076 A * | 10/1999 | Mason et al. | ............... 427/376.2 |
| 6,150,033 A | 11/2000 | Mosser et al. | |
| 6,458,423 B1 | 10/2002 | Goodson | |
| 6,733,907 B2 * | 5/2004 | Morrison et al. | ............. 428/699 |
| 6,783,799 B1 | 8/2004 | Goodson | |
| 6,858,174 B2 | 2/2005 | Nair et al. | |
| 2004/0043204 A1 | 3/2004 | Nair et al. | |
| 2004/0154725 A1 | 8/2004 | Mako et al. | |

OTHER PUBLICATIONS

Young, Lee W., "International Search Report", (Oct. 1, 2008),1-2.
Young, Lee W., "Written Opinion of the International Searching Authority", (Oct. 1, 2008),1-6.
Aremco Products, "High Temperature Ceramic Adhesives & Pastes", *Technical Bulletin A2*, Rev. 1/06, 1-4.

* cited by examiner

*Primary Examiner* — Philip Tucker
*Assistant Examiner* — Alex Efta
(74) *Attorney, Agent, or Firm* — David Fonda

(57) ABSTRACT

A method for joining multiple ceramic components together is disclosed in one embodiment of the invention as including providing multiple ceramic components, each having a mating surface. A slip containing a mixture of alumina powder and a phosphate-containing reagent is applied to one or more of the mating surfaces. The mean particle size of the alumina powder is tailored to provide improved strength to the bond. Once the slip is applied, the ceramic components may be joined together at their mating surfaces. The joint may then be sintered to react the constituents in the mixture and thereby generate a bond between the ceramic components.

26 Claims, 4 Drawing Sheets

METHOD FOR JOINING CERAMIC COMPONENTS

RELATED APPLICATIONS

This application is a continuation-in-part of U.S. patent application Ser. No. 11/464,476 filed on Aug. 14, 2006, now U.S. Pat. No. 7,628,951, and entitled PROCESS FOR MAKING CERAMIC INSULATION.

BACKGROUND OF THE INVENTION

1. Field of the Invention

The present invention relates to ceramics and more particularly to methods for joining ceramic components.

2. Description of the Related Art

Advanced ceramics and fiber-reinforced ceramic matrix composites with characteristics such as high strength, toughness, good thermal conductivity, thermal shock resistance, and oxidation resistance are needed for many applications. The properties of many ceramic materials, such as hardness, stiffness, heat-resistance, corrosion resistance, low density, and low cost, make these materials highly desirable for many applications, including aeronautical, automotive, military, communications, medical, consumer, and computer applications, to name just a few.

Nevertheless, engineering designs for many applications require fabricating parts with relatively complex shapes and geometries. Many of these shapes may be quite expensive and in some cases impossible to manufacture using conventional ceramic fabrication techniques. For example, as illustrated in FIG. 1, a simple U-shaped tube 100 may be very difficult to produce using conventional ceramic fabrication techniques, such as slip casting, tape casting, injection molding, dry pressing, or the like.

In many cases, it may be more cost-effective to produce complex shapes by joining simpler geometrical shapes together. For example, as illustrated in FIG. 2, it may be more cost-effective to produce the U-shaped tube 100 illustrated in FIG. 1 by joining together multiple simpler components 200a-d, each of which may be more easily fabricated using conventional ceramic fabrication techniques. Accordingly, the ability to join multiple ceramic components together is an important to the utilization of advanced ceramics and fiber-reinforced composite components in many applications.

Currently, ceramic components may be joined together using various conventional organic adhesives. Many of these adhesives, however, may combust and degrade when subjected to temperatures exceeding 200° C. Other inorganic ceramic binders have been developed that can withstand temperatures of 1600° C. or more. These binders typically combine an inorganic binding compound, such alkali silicates or metal phosphates, with ceramic powders, such as powders of alumina, silica, magnesia, or zirconia. Many of these binders, however, do not provide the strength needed for many applications. Other binders may shrink more than desired or exhibit different thermomechanical properties (e.g., coefficient of thermal expansion (CTE)) than the materials they bind together. Other binder types degrade in strength at higher temperatures.

In view of the foregoing, what is needed is an improved method for joining ceramic components that exhibits acceptable strength, environmental stability, and thermomechanical properties that are stable at high temperatures. Ideally, the method would provide a bond with properties comparable to those of the material or materials it binds together. Further needed is a method to create a bond that will begin bonding at room temperature, exhibit minimal shrinkage, and increase in strength as it is exposed to higher temperatures.

SUMMARY OF THE INVENTION

The present invention has been developed in response to the present state of the art, and in particular, in response to the problems and needs in the art that have not yet been fully solved by currently available techniques for joining ceramic components. Accordingly, a method has been developed to produce a bond that provides improved strength, in some cases equal to or greater than the ceramic components it binds together, while also providing improved matching of thermal properties (e.g., CTE). Further disclosed is a method for producing a bond that is stable at high temperatures, begins bonding at room temperature, and exhibits minimal shrinkage.

Consistent with the foregoing and in accordance with the invention as embodied and broadly described herein, a method for joining multiple ceramic components together is disclosed in one embodiment of the invention as providing multiple ceramic components, each having a mating surface. A slip containing a mixture of alumina powder and a phosphate-containing reagent is applied to one or more of the mating surfaces. The mean particle size of the alumina powder may be less than one micron. Once the slip is applied, the ceramic components may be joined together at their mating surfaces. The joint may then be sintered to react the constituents in the mixture and thereby generate a bond between the ceramic components.

In another aspect of the invention, a method for joining multiple ceramic components together includes providing multiple ceramic components, each having a mating surface. A slip containing a mixture of alumina powder and a phosphate-containing reagent is applied to one or more of the mating surfaces. The mean particle size of the alumina powder is less than ten microns and the molar ratio of aluminum to phosphorus is at least four. Once the slip is applied, the ceramic components may be joined together at their mating surfaces. The joint may then be sintered to react the constituents in the mixture and generate a bond between the ceramic components.

In another aspect of the invention, a method for joining multiple ceramic components together includes providing multiple ceramic components, each having a mating surface. One or more of the ceramic components is produced from a first slip containing a mixture of alumina powder and a phosphate-containing reagent. A second slip (which may be the same as the first slip) containing a mixture of alumina powder and a phosphate-containing reagent is applied to one or more of the mating surfaces. Once applied, the ceramic components may be joined together at their mating surfaces. The joint may then be sintered to react the constituents in the mixture and generate a bond between the ceramic components.

In yet another aspect of the invention, a method for joining multiple ceramic components together includes providing a ceramic monolith having a mating surface and a fiber-based ceramic component also having a mating surface. A slip containing a mixture of alumina powder and a phosphate-containing reagent is applied to one or more of the mating surfaces. The mean particle size of the alumina powder is less than ten microns. Once the slip is applied, the ceramic monolith and fiber-based ceramic component may be joined together at their mating surfaces. The joint may then be sintered to react the constituents in the mixture and generate a bond between the components.

The present invention relates to improved methods for joining ceramic components. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts may be designated by like numerals throughout.

Figure 1:
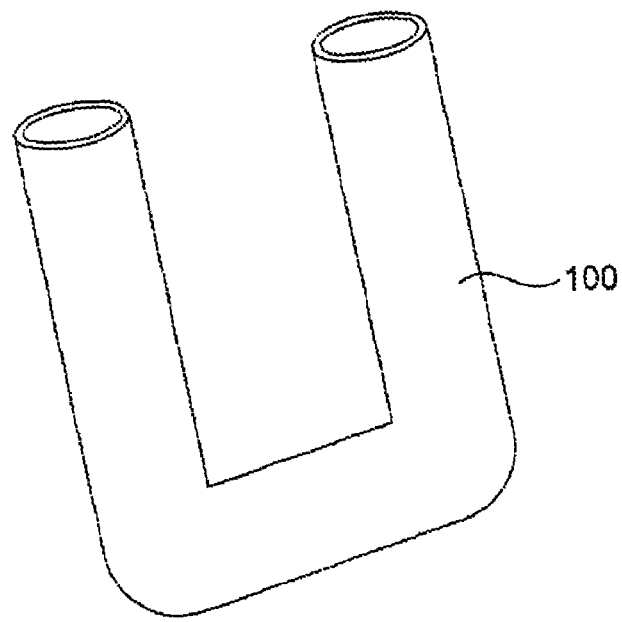
FIG. 1 is a perspective view of one embodiment of a complex shape that may be difficult to manufacture using conventional ceramic fabrication techniques.
Figure 2:
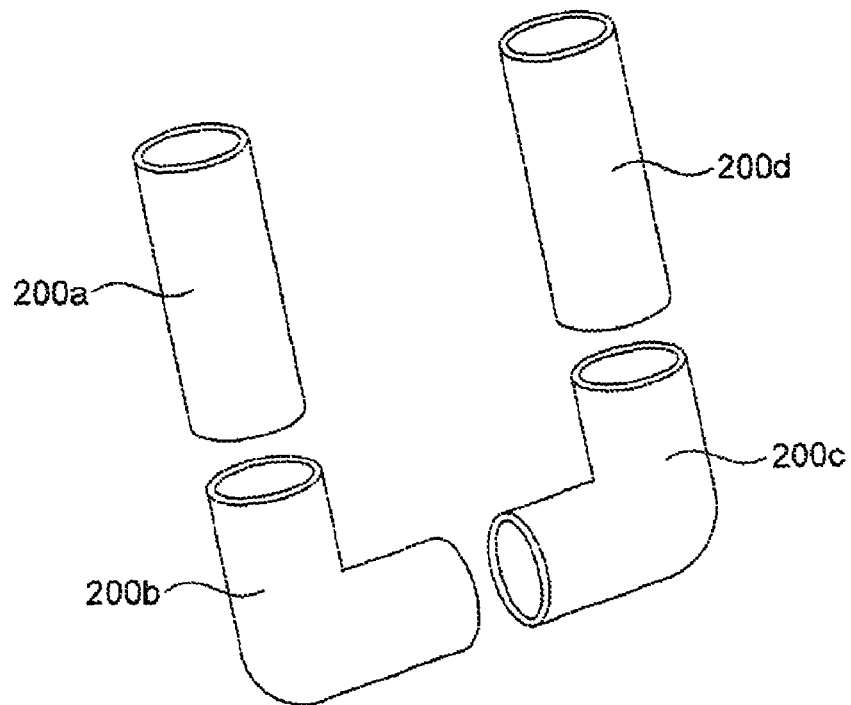
FIG. 2 is a perspective view of the shape illustrated in FIG. 1 divided into several simpler components.
Figure 3:
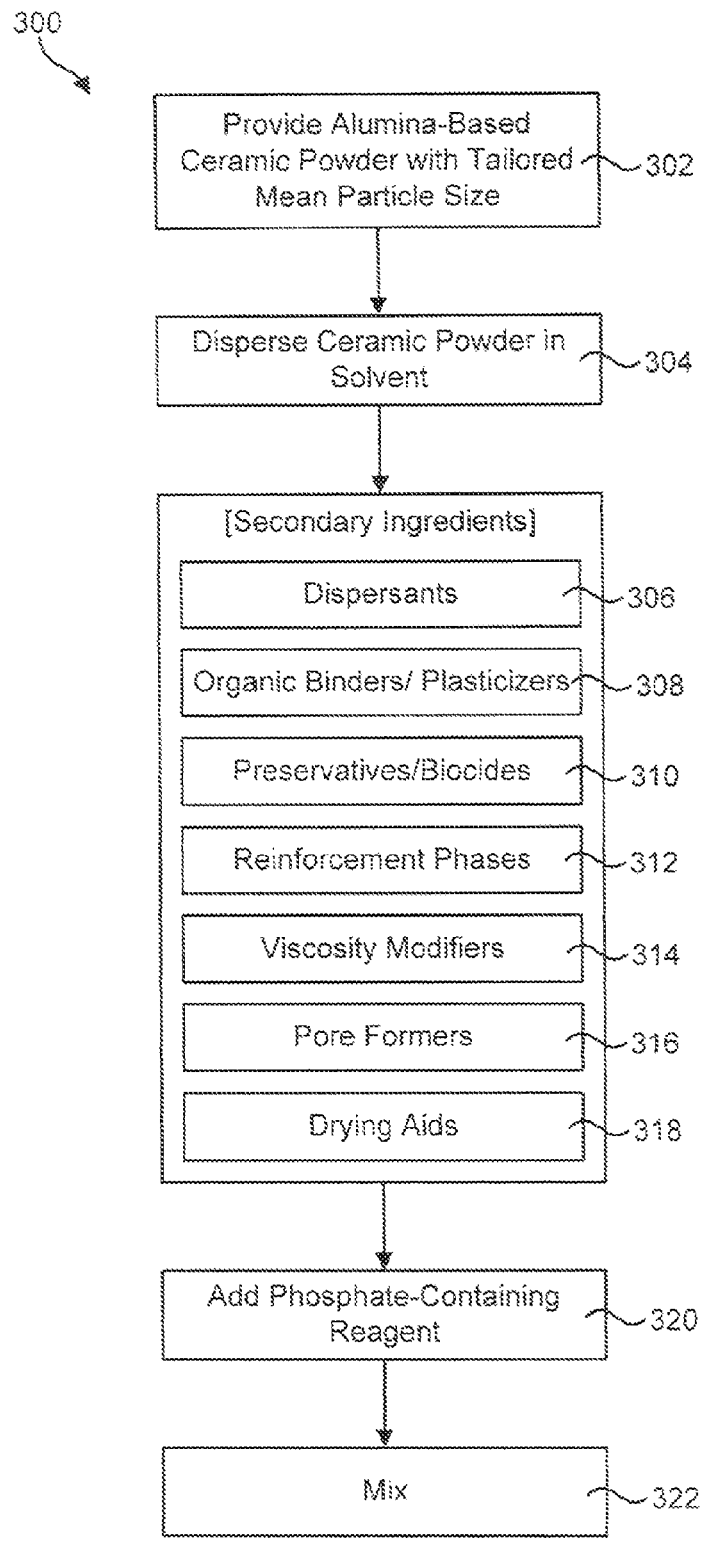
FIG. 3 is a flow chart illustrating one embodiment of a method for producing the slip for a binder in accordance with the invention.

Referring to FIG. 3, in one embodiment in accordance with the invention, a method 300 to produce a slip suitable for use as a ceramic-to-ceramic binder may include initially providing 302 a ceramic powder having a tailored mean particle size. In one embodiment, the ceramic powder is an alumina-based ceramic powder. In selected embodiments, the mean particle size is less than ten microns. In other embodiments, the mean particle size is less than one micron. Suitable alumina-based ceramic powders may include, for example, powders of alumina, alpha-alumina, aluminum hydroxide, boehemite, pseudoboehemite, gamma-alumina, theta-alumina, bauxite, corundum, diaspore, and mixtures thereof. In selected embodiments, the slip may contain between about 10 and 70 percent by weight of the alumina-based powder.

As will be explained in more detail hereafter, the reduced particle size provides several advantages over conventional phosphate binders. For example, the reduced particle size significantly reduces shrinkage of the binder upon curing and/or sintering. The binder typically exhibits less than fifteen percent shrinkage when sintered at temperatures between about 100° C. and 1500° C. This shrinkage is typically reduced to less than two percent when the sintering temperature is less than or equal to 1300° C. Similarly, the shrinkage is typically reduced to less than one percent when the sintering temperature is less than or equal to 1000° C.

Another advantage of the reduced particle size is that the smaller particles in the binder will begin to react at room temperature. As a result, the binder may be applied to ceramic components at room temperature and have sufficient structural integrity upon drying (but without curing or firing) that the ceramic components may be moved and manipulated (e.g., moved to an oven for firing) without breaking the bond between the components. Of course, as will be explained hereafter, this bond may be hardened and densified to provide additional desired strength upon curing and/or sintering the bond at elevated temperatures. Nevertheless, the room-temperature process differs from many conventional binders which may require temperatures of greater than 100° C. or high energy mixing to initiate the bonding reaction.

Once a suitable alumina powder has been selected, the powder may be dispersed 304 in an organic or aqueous solvent, or mixture thereof, using appropriate dispersants 306. Suitable dispersants 306 may include, for example, ammonium polymethacrylate or polymethyl methacrylate (PMMA). In selected embodiments, the alumina powder and the solvent may be milled together in the presence of the dispersant to achieve a more stable suspension. Suitable milling techniques may include, for example, jet milling, ball milling, paint-shaking, attrition milling, or the like.

The smaller particle sizes of the ceramic powder make it easier to disperse in solvent. By selecting a suitable dispersant 306 and processing steps, the agglomerates of alumina powder may be broken up and dispersed as individual particles in the solvent. The high degree of dispersion allows the alumina particles to be surrounded by solvent and provides more intimate contact between the alumina particles and the phosphate-containing reagent, as will be explained in more detail hereafter. The improved contact between the alumina particles and the phosphate-containing reagent reduces the amount of phosphate-containing reagent needed to complete the reaction because more of the reagent is able to react with the alumina particles. While not necessary in all cases, a dispersant 306 may also improve the workability of the slip and improve the quality and properties of the final bond.

In selected embodiments, organic materials such as binders 308 and plasticizers 308 may be added to the slip to impart green strength, handleability, and workability to the slip. Suitable binders may include, for example, agar, latex, aquazol, polyvinyl acetate (PVA), or the like. In certain embodiments, organic materials such as preservatives 310 and biocides 310 may also be added to the slip to improve its shelf life. In certain embodiments, the slip may contain between about 0 to 25 percent by weight of the above-described organic materials. These materials may be burned off when the binder is cured or fired.

In certain embodiments, one or more secondary phases may be added to the slip to provide additional properties to the binder. For example, secondary phases such as opacifiers, reinforcement phases, viscosity modifiers, drying aids, or the like, may be added to the slip. These secondary phases may be organic or inorganic and may be added to the slip in fiber or powder form. Suitable secondary phase materials may include, for example, carbides (e.g., SiC, $B_4C$, etc.), nitrides (e.g., $Si_3N_4$), borides, silicates, oxides, sulfates, aluminates, mixed oxides, mullite, silicon nitride, silicon carbide, zirconia, magnesia, spinel, chrome oxide, yttria, carbon, aluminosilicate, kyanite, clay, bentonite, sudaglass, iron oxide, glass frit, titania, perlite, zircon, alumina, glass, aluminum hydroxide vermiculite, aluminosilicates, silica, aluminum, iron, nickel, cobalt, palladium, tungsten, platinum, graphite, steel, zinc, copper, barium sulfate, zirconium diboride, calcium fluoride, pyrophillite, baddeleyite, magnesium, and heat resistant polymeric powders or fibers. Other secondary phase materials may include hollow or solid alumina spheres, zirconia spheres, fillite spheres, and silica spheres. The secondary phase may be included in any suitable ratio relative to the primary ceramic. In selected embodiments, the slip may contain between about 0 and 90 percent by volume or between about 0 to 75 percent by weight of a secondary phase.

In selected embodiments, a reinforcement phase 312 may be added to the slip to enhance the strength or toughness of the binder, control the binder's shrinkage, modify thermomechanical properties of the binder, increase the binder's damage tolerance, or the like. In selected embodiments, the reinforcement phase may be provided in the form of chopped fibers having a length between about 25 microns and 6 millimeters, which may be dispersed uniformly through the slip and may, in certain embodiments, be randomly oriented through the slip. In selected embodiments, the slip may contain between about 0 and 60 percent by weight of a reinforcement phase 312.

In selected embodiments, one or more viscosity modifiers 314 may be added to the slip. For example, various liquids such as methanol, solids such as mullite powder (e.g., 1-5 micron particle size), and organic materials such as glycerin may be added to reduce the viscosity of the slip. Similarly, materials such as magnesium oxide and agar may be added to increase the viscosity. In certain embodiments, drying aids 318 such as magnesia (MgO), glycerin, or the like, may also be added to the slip.

In certain embodiments, it may be desirable to form pores in the binder. For example, if the ceramic components that are being joined together are porous, it may be desirable to provide a binder that closely matches the porosity of the components. Thus, in selected embodiments, a "pore-former" 316 may be added to the slip to form pores in the binder. This pore-former may, in certain embodiments, also act as a secondary phase in the binder. Suitable pore-forming compositions may include, for example, synthetic compositions such as carbon (powder or fibers), polymer (powder or fibers), foam bubbles, mylar or natural ingredients such as sucrose, sugar, salt, agar, microcellulose, starch, or the like. The slip may contain between about 0.1 to 80 percent by volume or between about 0 and 45 percent by weight of a pore-former.

A phosphate-containing reagent may then be added 320 to the slip to produce a final slip. Suitable phosphate-containing reagents may include, for example, monoaluminum phosphate, monoammonium phosphate, diammonium phosphate, magnesium phosphate, or phosphoric acid. In general, the phosphate-containing reagent reacts with the alumina powder in the slip to generate the bond. Where phosphoric acid is used, the phosphate-containing reagent may react with the alumina powder to form aluminum phosphate and water in accordance with the following reaction:

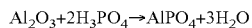

$$Al_2O_3 + 2H_3PO_4 \rightarrow AlPO_4 + 3H_2O$$

In conventional binders, the molar ratio of aluminum to phosphorus is typically less than or equal to 1.0. That is, the reaction mixture is typically rich in phosphorus. By contrast, the binder disclosed herein may contain a significantly lower amount of phosphate-containing reagent. In selected embodiments, the molar ratio of aluminum to phosphorus is between about 4.0 and 65.0. Since the disposal of phosphate-based compounds may be an environmental concern, lowering the amount of phosphate-containing reagent may reduce financial and environmental costs associated with the final product.

After combining each of the above ingredients, the resulting combination may be mixed 322 vigorously to optimally blend the ingredients, especially where there is a high volume of solids. The mixing may be performed using a high energy blender, disperser, jet mill, vibratory mill, paint shaker, shear mixer, attrition mill, or a centrifugal-cum-rotational mixer. The mixing may be performed at room temperature, although the slip may slightly increase in temperature during and after the mixing process. If desired, the mixing may be performed at any temperature between about 15° C. and 100° C., but is ideally performed at or near standard room temperature.

Figure 4:
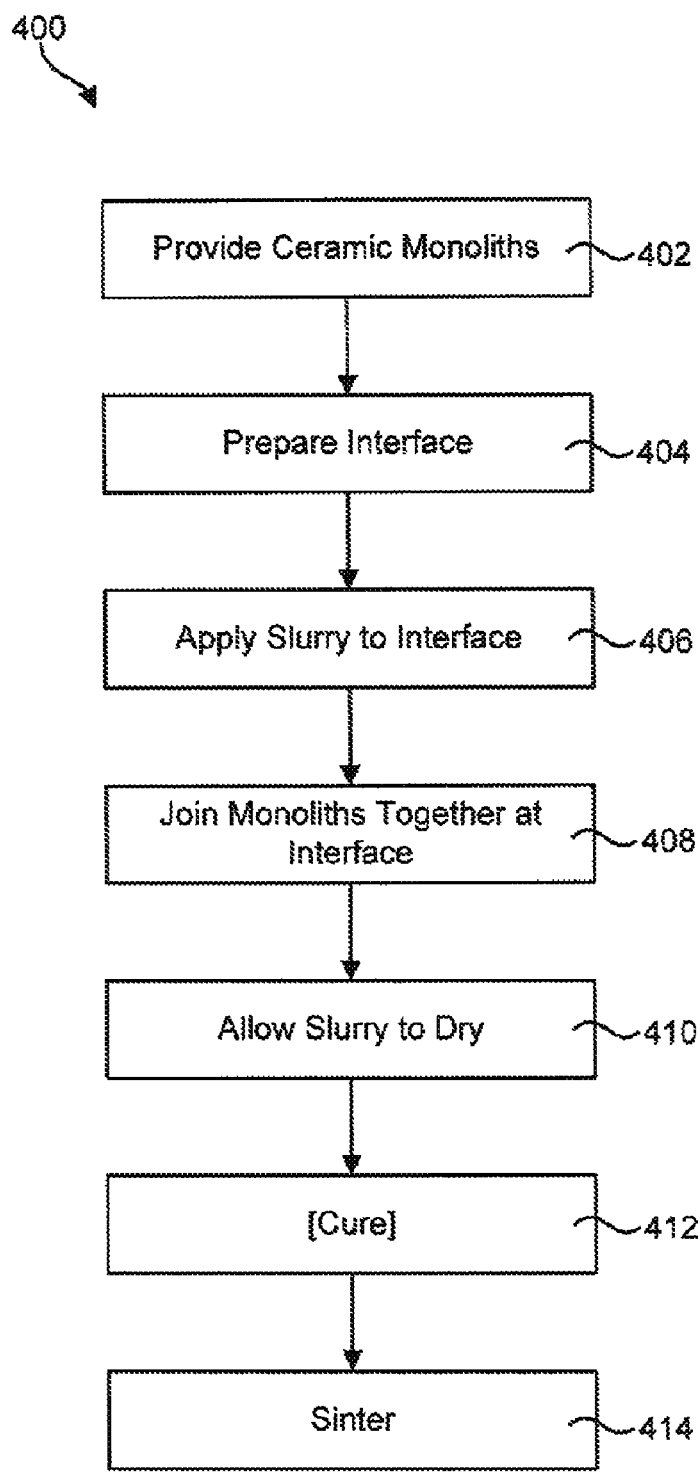
FIG. 4 is a flow chart illustrating one embodiment of a method for joining multiple ceramic components using a binder in accordance with the invention.

Referring to FIG. 4, one embodiment of a method 400 for joining ceramic components using the slip prepared by the method 300 may include initially providing 402 two or more ceramic monoliths. The monoliths may be fabricated from a number of ceramic materials including, for example, alumina, mullite, cordierite, magnesia, iron oxide, barium oxide, zinc oxide, copper oxide, tungsten oxide, samaria, ruthenium oxide, silicon carbide, silicon nitride, ceria, yttria, silica, calcia, titania, and zirconia or the like.

The ceramic monoliths may also include monoliths fabricated from the above-described slip by casting, injection molding, die stamping, or the like. Thus, as will be described in additional detail hereafter, one or more monoliths and the bond may contain substantially the same material. This may be advantageous because the monolith and the bond may have substantially the same properties, including similar strength, toughness, elasticity, thermomechanical properties (e.g., CTE, thermal conductivity, etc.), porosity, color, and the like. In such an embodiment, the slip may create a bond having strength and properties that are virtually indistinguishable from the monoliths that it bonds together, in effect creating a single monolith from multiple monoliths.

The ceramic monoliths being joined together may be green, cured, or sintered ceramics. Ideally, however, the ceramic monoliths are green to provide better bonding with the slip. That is, the green monoliths provide more thermodynamic energy to react with, and thus bond with, the slip.

The method 400 may then include preparing 404 the interface between the ceramic monoliths. This may include, for example, cleaning, etching, or roughening the mating surfaces in preparation to receive the slip. In some cases, a simple cleaning may be sufficient to create a good bond with the binder, particularly for green ceramic components.

Once the mating surfaces are prepared, the slip may be applied 406 to one or more of the mating surfaces. This may be accomplished by dipping, spraying, brushing, pouring, or otherwise applying the slip to one or more mating surfaces. The ceramic components may then be joined 408 together at their mating surfaces. After joining, the binder is allowed to dry 410 at room temperature or at a temperature between about 15° C. and 100° C. The binder will begin to react during the drying stage and will create a bond sufficient to move and manipulate the ceramic monoliths, without breaking the bond. As a result, the components may be moved to an oven or other device for further curing or sintering without damaging the bond.

Optionally, the binder may be cured 412 at a temperature below about 300° C. to slowly react the binder, control shrinkage, and prevent cracking. The binder may then be sintered 414 at a temperature between about 100° C. and 1600° C. to further harden and densify the bond. One notable benefit of the binder is that it will produce a very high strength bond at relatively low sintering temperatures by ceramic standards.

For example, the binder may provide strength between about 30 and 100 MPa when sintered at temperatures as low as 900° C. Even when sintered at lower temperatures, the binder may remain stable at much higher temperatures.

Figure 5:
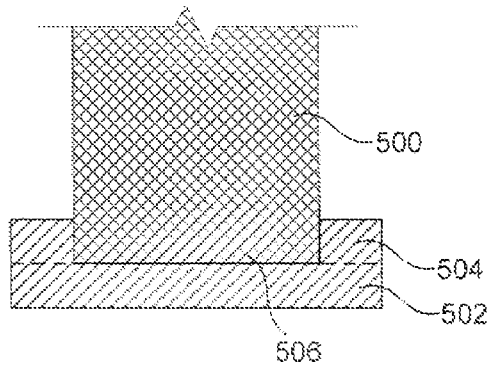
FIGS. 5 through 8 show several different methods for binding a fiber-based material to a ceramic monolith using a binder in accordance with the invention.

Referring to FIG. 5, in selected embodiments, the slip disclosed herein may be useful to join various fiber-based ceramic materials to ceramic monoliths. This may be helpful in applications where a fiber-based material may be joined to a monolith. In one embodiment, a fiber-based ceramic material 500, such as a fiber bed (or a fiber mat) 500 of alumina fibers, may be positioned adjacent to a ceramic substrate 502, such an alumina-based substrate or a substrate fabricated from the slip discussed herein. The fiber material 500 may be green, cured, or fired. Prior to or after abutting the fiber material 500 against the substrate 502, the slip disclosed herein may be poured onto the substrate 502 to create a layer 504. This slip may permeate the lower edge 506 of the fiber material 500 and penetrate the fiber material 500 to create a continuous network of binder through the fiber material 500.

If desired, the fiber material 500 may be pre-dipped in an aqueous or non-aqueous solution prior to pouring the slip onto the substrate 502 to keep the slip from wicking into the fiber material 500. The slip may be allowed to dry and then fired at a temperature between about 250° C. and 1600° C. to harden and strengthen the layer 504. Optionally, the slip may be cured between the drying and firing steps. After firing, the layer 504 and substrate 502 may form a substantially monolithic structure with the fiber material 500 being embedded within the structure.

In another embodiment, the slip may be poured to create both layers 502, 504. While still wet, the fiber material 500 may be dipped to penetrate the layer 504, while not penetrating the layer 502. The resulting structure may then be dried and fired as previously explained. In this way, the substrate 502 and the bond (i.e., the layer 504) may be created simultaneously. This is also a way to secure a fibrous body to a monolith using a ceramic bond.

Figure 6:
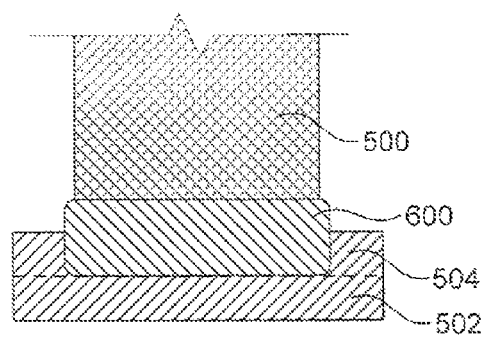

Referring to FIG. 6, in another embodiment, part of the fiber material 500 may be pre-dipped or pre-coated with a ceramic layer prior to abutting it against the substrate 502. For example, an edge of the fiber material 500 may be permeated and covered with a coating 600 (which may be considered a ceramic monolith) by dipping it in the slip disclosed herein. At this stage, the coating 600 may be left green or may be fired to harden and densify the coating 600.

The slip may then be poured onto the substrate 502 to create a layer 504. The coating 600 may then be dipped into the wet layer 504 until it abuts against the substrate 502. Alternatively, if both layers 502, 504 are wet, the coating 600 may be dipped until it penetrates the first layer 504. Once the slip is dry, the entire assembly may be fired at a temperature between about 250° C. and 1600° C. to harden and strengthen the coating 600 and the layer 504. This embodiment differs from that illustrated in FIG. 5 in that two ceramic monoliths (i.e., the coating 600 and the substrate 502) are joined together by the layer 504, as opposed to joining a monolith 502 directly to a fiber-based material 500.

Figure 7:
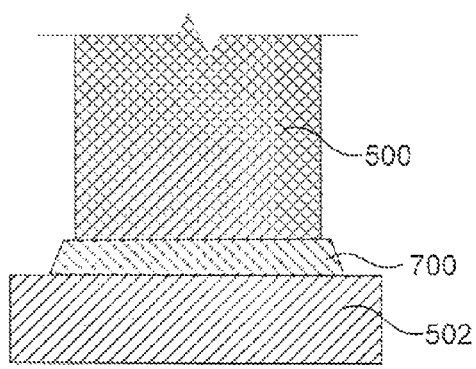

Referring to FIG. 7, in another embodiment, an edge of the fiber material 500 may be dipped or wetted with the disclosed slip and abutted against a substrate 502. If desired, the substrate 502 may be roughened prior to performing this step. The joint may then be allowed to dry and the assembly may be fired at a temperature between about 250° C. and 1600° C. to harden and strengthen the bond 700.

Figure 8:
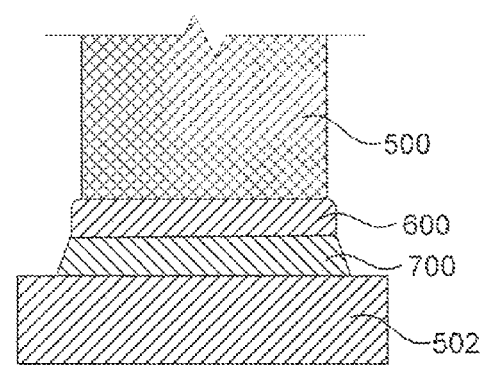

Referring to FIG. 8, in yet another embodiment, the fiber material 500 may be coated with a ceramic layer prior to abutting it against the substrate 502. For example, as explained previously, an edge of the fiber material 500 may be coated by dipping it in the slip disclosed herein. The coating 600 may be left green or may be fired to harden and densify the coating 600.

The coating 600 may then be dipped in or wetted with the disclosed slip and abutted against the substrate 502. If desired, the substrate 502 may be roughened prior to abutting the fiber material 500. The joint may then be allowed to dry and the assembly may be fired at a temperature between about 250° C. and 1600° C. to harden and strengthen the bond 700.

The following are several non-limiting examples of methods for making and joining ceramic components using a slip in accordance with the invention:

Example 1

A slip, containing the reactants alumina powder and phosphoric acid, among other constituents, may be produced using the process described in association with FIG. 3. Two ceramic components may be fabricated by pouring the slip into a mold. The slip may then be dried at room temperature to provide a pair of green ceramic components. The slip may then be applied to one or more mating surfaces of the green components. While the slip is still wet, the components may be joined together at their mating surfaces. Pressure may or may not be applied to the joint. The joint may then be allowed to dry and the entire assembly may be fired at a temperature between about 250° C. and 1600° C. to harden and densify the ceramic components and the joint.

Two green ceramic components were joined using the process described in the previous paragraph and fired at a temperature of approximately 900° C. The slip contained alumina powder having a mean particle size between 1 and 5 microns. The fired components were then used to produce bars which were used to measure flexural strength. A mean (room temperature) 4-point flexural strength of 23 MPa was measured on the test samples. The flexural strength of the joined component increases by as much as two times to four times (2×-4×) as the firing (or operating) temperature is increased from 900° C. to 1500° C.

Example 2

A slip, containing the reactants alumina powder and phosphoric acid, among other constituents, may be produced using the process described in association with FIG. 3. Two ceramic components may be fabricated by pouring the slip into a mold. The slip may then be cured at a temperature between about 40° C. and 250° C. until the ceramic components are semi-hard. The hardness may be increased by increasing the curing temperature. The slip may then be applied to one or more mating surfaces of the pre-cured components. If desired, the mating surfaces may be polished or roughened prior to applying the slip. While the slip is still wet, the components may be joined together at their mating surfaces. Pressure may or may not be applied to the joint. The joint between the cured ceramic components may then be allowed to dry and the entire assembly may be fired at a temperature between about 250° C. and 1600° C.

Two ceramic components pre-cured at 220° C. were joined using the process described in the previous paragraph and fired at a temperature of approximately 900° C. The slip used for the binder contained alumina powder having a mean particle size between 1 and 5 microns. The fired components were then used to produce bars which were used to measure flexural strength. A mean (room temperature) 4-point flexural strength of 33 MPa was measured on the test samples.

Example 3

A slip, containing the reactants alumina powder and phosphoric acid, among other constituents, may be produced using the process described in association with FIG. 3. Two ceramic components may be fabricated by pouring the slip into a mold. The slip may then be fired at a temperature between about 250° C. and 1400° C. until the ceramic components are hard and strong. Their hardness and strength may be increased by increasing the firing temperature. The slip may then be applied to one or more mating surfaces of the fired components. If desired, the mating surfaces may be polished or roughened prior to applying the slip. While the slip is still wet, the components may be joined together at their mating surfaces. Pressure may or may not be applied to the joint. The joint may then be allowed to dry and the entire assembly may be fired at a temperature between about 250° C. and 1600° C.

Two ceramic components, pre-fired at 1300° C., were joined using the process described in the previous paragraph and fired at a temperature of approximately 900° C. The slip used for the binder contained alumina powder having a mean particle size between 1 and 5 microns. The fired components were then used to produce bars which were used to measure flexural strength. A mean (room temperature) 4-point flexural strength of 48 MPa was measured on the test samples.

Example 4

Two alumina monoliths may be provided. These monoliths may have an alumina content ranging from about 50 to 100 percent. The monoliths may be pre-fired at a temperature between about 200° C. and 1600° C. The mating surfaces may be polished or roughened if desired. A slip, containing the reactants alumina powder and phosphoric acid, among other constituents, may be prepared using the process described in association with FIG. 3. The slip may then be applied to one or more mating surfaces of the alumina monoliths. While the slip is still wet, the monoliths may be joined together at their mating surfaces. Pressure may or may not be applied to the joint. The joint may then be allowed to dry and the entire assembly may be fired at a temperature between about 250° C. and 1600° C.

Example 5

Two green (i.e., un-fired) alumina monoliths may be provided. These monoliths may have an alumina content ranging from about 50 to 100 percent. The mating surfaces may be polished or roughened if desired. A slip, containing the reactants alumina powder and phosphoric acid, among other constituents, may be prepared using the process described in association with FIG. 3. The slip may then be applied to one or more mating surfaces of the green alumina monoliths. While the slip is still wet, the monoliths may be joined together at their mating surfaces. Pressure may or may not be applied to the joint. The joint may then be allowed to dry and the entire assembly may be fired at a temperature between about 250° C. and 1600° C.

Example 6

Two ceramic monoliths may be provided. One of the monoliths may be green while the other may be pre-cured (e.g., 40° C.-250° C.) or pre-fired (e.g., 200° C.-1600° C.). These monoliths may be of the same or different compositions. For example, one monolith may be fabricated from a slip containing alumina powder and phosphoric acid while the other monolith may be fabricated from conventional alumina having 50 to 100 percent alumina content. The mating surfaces may be polished or roughened if desired. A slip, containing the reactants alumina powder and phosphoric acid, among other constituents, may be prepared using the process described in association with FIG. 3. The slip may then be applied to one or more of the mating surfaces of the monoliths. While the slip is still wet, the monoliths may be joined together at their mating surfaces. Pressure may or may not be applied to the joint. The joint may then be allowed to dry and the entire assembly may be fired at a temperature between about 250° C. and 1600° C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for joining multiple ceramic components together, the method comprising:
providing a first ceramic component having a first mating surface and a second ceramic component having a second mating surface adapted to mate with the first mating surface;
applying a slip to at least one of the first and second mating surfaces, the slip comprising a mixture of alumina powder and a phosphate-containing reagent to react with the alumina powder, the alumina powder having a mean particle size of less than 1 micron, wherein the molar ratio of total aluminum from the alumina powder to total phosphorus from the phosphate-containing reagent is between 8 and about 65;
joining the first and second mating surfaces together; and
sintering the slip to react the mixture and thereby generate a bond between the first and second ceramic components.

2. The method of claim 1, wherein at least one of the first and second ceramic components is a ceramic monolith.

3. The method of claim 1, wherein at least one of the first and second ceramic components is a fiber-based ceramic material.

4. The method of claim 1, wherein the phosphate-containing reagent is phosphoric acid.

5. The method of claim 1, wherein at least one of the first and second ceramic components contains at least fifty percent of one of the following materials: alumina, mullite, cordierite, magnesia, iron oxide, barium oxide, zinc oxide, copper oxide, tungsten oxide, samaria, ruthenium oxide, silicon carbide, silicon nitride, ceria, yttria, silica, calcia, titania, and zirconia.

6. The method of claim 1, wherein at least one of the first and second ceramic components is selected from the group consisting of a green ceramic component, a pre-sintered ceramic component, and a sintered ceramic component.

7. The method of claim 1, wherein sintering comprises sintering at a temperature less than 1000° C.

8. The method of claim 1, wherein sintering comprises sintering at a temperature less than 1600° C.

9. A method for joining multiple ceramic components together, the method comprising:

providing a first ceramic component having a first mating surface and a second ceramic component having a second mating surface adapted to mate with the first mating surface;

applying a slip to at least one of the first and second mating surfaces, the slip comprising a mixture of alumina powder and a phosphate-containing reagent to react with the alumina powder, the alumina powder having a mean particle size of less than 10 microns, the mixture having a molar ratio of total aluminum from the alumina powder to total phosphorus from the phosphate-containing reagent is between 8 and about 65;

joining the first and second mating surfaces together; and sintering the slip to react the mixture and thereby generate a bond between the first and second ceramic components.

10. The method of claim 9, wherein at least one of the first and second ceramic components is a ceramic monolith.

11. The method of claim 9, wherein at least one of the first and second ceramic components is a fiber-based ceramic material.

12. The method of claim 9, wherein the phosphate-containing reagent is phosphoric acid.

13. The method of claim 9, wherein at least one of the first and second ceramic components is selected from the group consisting of a green ceramic component, a pre-sintered ceramic component, and a sintered ceramic component.

14. The method of claim 9, wherein sintering comprises sintering at a temperature less than 1000° C.

15. The method of claim 9, wherein sintering comprises sintering at a temperature less than 1600° C.

16. A method for joining multiple ceramic components together, the method comprising:
providing a first ceramic component having a first mating surface and a second ceramic component having a second mating surface adapted to mate with the first mating surface, wherein at least one of the first and second ceramic components is produced by casting a first slip comprising a mixture of alumina powder and a phosphate-containing reagent to react with the alumina powder;

applying a second slip to at least one of the first and second mating surfaces, the second slip comprising a mixture of alumina powder and a phosphate-containing reagent to react with the alumina powder, wherein the molar ratio of total aluminum from the alumina powder (in both the first slip and the second slip) to total phosphorus from the phosphate-containing reagent (in both the first slip and the second slip) is between 8 and about 65;

joining the first and second mating surfaces together; and sintering the second slip to react the mixture and thereby generate a bond between the first and second ceramic components.

17. The method of claim 16, wherein the first slip comprises substantially the same materials as the second slip.

18. The method of claim 16, wherein the phosphate-containing reagent of the first slip and the phosphate-containing reagent of the second slip are both phosphoric acid.

19. The method of claim 16, wherein at least one of the first and second ceramic components is selected from the group consisting of a green ceramic component, a pre-sintered ceramic component, and a sintered ceramic component.

20. The method of claim 16, wherein, after sintering, the first and second slips have substantially the same coefficients of thermal expansion.

21. The method of claim 16, wherein at least one of the first and second ceramic components contains at least fifty percent of one of the following materials: alumina, mullite, cordierite, magnesia, iron oxide, barium oxide, zinc oxide, copper oxide, tungsten oxide, samaria, ruthenium oxide, silicon carbide, silicon nitride, ceria, yttria, silica, calcia, titania, and zirconia.

22. A method for joining multiple ceramic components together, the method comprising:
providing a ceramic monolith having a first mating surface and a fiber-based ceramic component having a second mating surface adapted to mate with the first mating surface;

applying a slip to at least one of the first and second mating surfaces, the slip comprising a mixture of alumina powder and a phosphate-containing reagent to react with the alumina powder, the alumina powder having a mean particle size of less than 10 microns, wherein the molar ratio of total aluminum from the alumina powder to total phosphorus from the phosphate-containing reagent is between 8 and about 65;

joining the first and second mating surfaces together; and sintering the slip to react the mixture and thereby generate a bond between the ceramic monolith and the fiber-based ceramic component.

23. The method of claim 22, wherein the phosphate-containing reagent is phosphoric acid.

24. The method of claim 22, wherein the ceramic monolith is selected from the group consisting of a green ceramic component, a pre-sintered ceramic component, and a sintered ceramic component.

25. The method of claim 22, wherein the ceramic monolith is produced by casting a slip comprising a mixture of alumina powder and a phosphate-containing reagent to react with the alumina powder.

26. A method for joining multiple ceramic components together, the method comprising:
providing a fiber-based ceramic component;

forming a ceramic monolith by casting a slip, the slip comprising a mixture of alumina powder and a phosphate-containing reagent to react with the alumina powder, the alumina powder having a mean particle size of less than 10 microns, wherein the molar ratio of total aluminum from the alumina powder to total phosphorus from the phosphate-containing reagent is between 8 and about 65;

dipping the fiber-based ceramic component into the slip; and sintering the slip to react the mixture and thereby generate a bond between the ceramic monolith and the fiber-based ceramic component.

* * * * *